Patented June 6, 1944

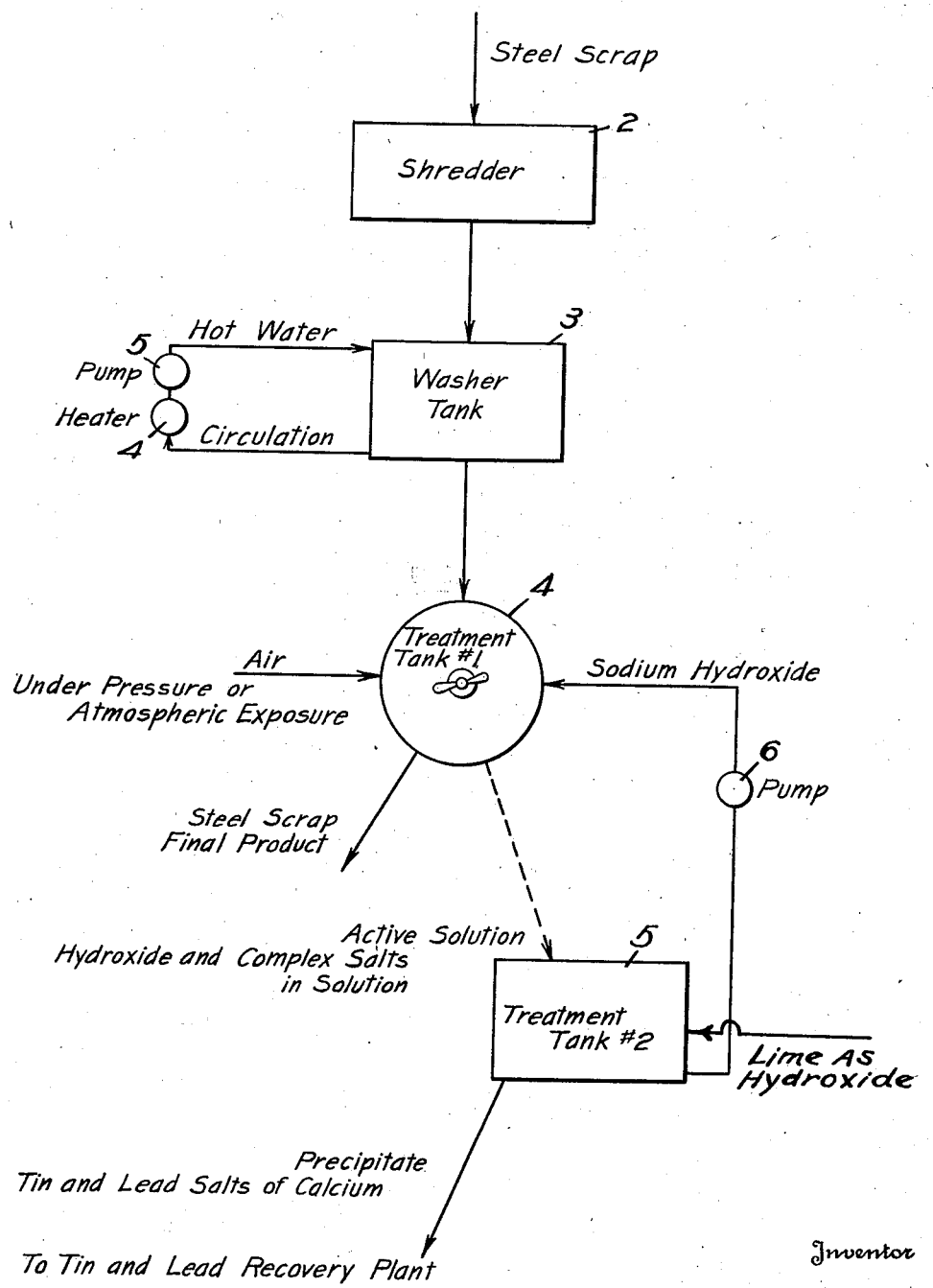

2,350,918

UNITED STATES PATENT OFFICE 2,350,918

METHOD OF TREATING TINNED STEEL SCRAP

William G. Norlander and Robert L. Alldredge, Denver, Colo., assignors of one-half to Philip Paden, Denver, Colo.

Application July 18, 1941, Serial No. 402,968

7 Claims. (Cl. 75—98)

This invention relates to the treatment of tinned steel scrap and more particularly relates to a treatment in which tin and lead ingredients are removed from a tinned steel scrap composition.

Waste materials such as tin cans, for example, afford a valuable source of supply of certain metals, such as steel and tin for example, provided that the composition of their original formation is changed by separation or partial separation of certain of the ingredients.

For most industrial purposes, a steel containing quantities of lead and tin usually present in the quantities prescribed for tin can usage is unsatisfactory and it is necessary to reduce the percentage of tin and lead in such compositions in converting such a steel into a marketable product.

Advantage may be taken of the separation requirements to produce additional market products such as tin and lead, in addition to the initial market product which is scrap steel containing only fractional quantities of other metals.

It is an object of the present invention to provide a simple, efficient and economical process for treating tinned steel scrap to produce scrap steel satisfying market specifications.

Another object of the invention is to provide a self-contained process for treating tinned steel scrap in which the reagent required at the initial reaction stage of the operation is produced in substantially the quantity required at such initial stage by a chemical conversion occurring in another reaction stage of the treatment.

A further object of the invention is to provide a simple, efficient and economical method for obtaining a substantial separation of the constituent metals present in tinned steel scrap.

Other objects reside in novel steps and treatments, all of which will appear more fully in the course of the following description.

While the present invention is capable of embodiment in a variety of operations, it will be described particularly with reference to an operation using materials of low cost according to present market prices, and in the subsequent description substitute materials will be designated which may be availed of without impairing efficiency of the treatment, to take advantage of fluctuations in price of the materials required in the operation.

The initial reaction of the operation involves the introduction of tinned steel scrap which preferably has first been cleansed and shredded, into a sodium hydroxide bath.

The chemical reaction resulting from this treatment produces complex salts of lead and tin in solution, which appear to be of two classes, namely, (a) sodium stannate or stannite or both, and (b) sodium plumbate or plumbite or both.

This reaction is permitted to continue until the lead and tin content of the steel is reduced within the limits prescribed for industrial utilization of such a composition. While the chemical reaction is known in the art, the control procedure employed in connection with this reaction stage involves novel methods.

It has been found that the reaction is much more complete and consequently faster, when the metallic surfaces are coated with the hydroxide solution, and while so coated are subjected to the action of air which may be obtained by atmospheric exposure or by introduction of the gas into the bath and its passage across the metallic surfaces and by producing foaming conditions within the bath which insure repeated and intimate contact of air with the coated surfaces.

When the reaction has progressed to the prescribed degree, the metal content may be removed, dried and is then in condition for the market. In usual practice, the scrap so removed from the treatment will be pressed into compact bundles to facilitate handling and transportation.

The active solution comprising the hydroxide containing the complex salts aforementioned, is then passed to a second reaction stage to regenerate the hydroxide for use at the first reaction stage and in so doing to recover the tin and lead content of the solution delivered to the second reaction stage.

In this operation, lime in the form of $Ca(OH)_2$ is added and the calcium ions from the lime precipitate the tin and lead in the active solution as salts of calcium. Simultaneously, any sodium carbonate occurring in the active solution is converted to sodium hydroxide and thus the solution is regenerated for use at the first reaction stage. The tin and lead content after precipitating is recovered separately from the solution and after collection in quantity may be subsequently treated by the usual methods to recover the tin and lead in metallic form if desired.

The regenerative action at the second reaction stage is sufficient to produce the hydroxide in the quantity desired at the initial reaction stage. Some slight losses of solution are occasioned by the separation of the solids from liquid at the respective stages, which require periodic replacement of minor amounts of solution over a period of time. However, it will be obvious from the foregoing that the process is substantially self-contained requiring only introduction of lime in the second reaction stage in order to permit continuous operation.

To afford a better understanding of the operating procedure, reference is now made to the accompanying flow sheet illustrating operating procedure well suited for the purposes of the present invention. The operation will be described in connection with the treatment of tinned scrap in the form of tin cans.

In this operation, the tin cans are initially fed into a shredding machine 2 which severs the can into strips of relatively small size.

The discharge from the shredder is delivered into a washing tank 3 having a circulating supply of hot wash liquid provided by a heater 4 and a pump 5. The action of the liquid in tank 3 serves to remove labels, adhesive, adhering food and other forms of refuse which adhere to the metallic surfaces, as they pass from the shredder into the tank 3.

After cleansing, the shredded metal is passed from tank 3 into the first reaction tank 4 containing sodium hydroxide solution in a quantity sufficient to permit thorough immersion of the metallic charge fed into tank 4. This tank is designated in the flow sheet as treatment tank #1 to designate the first reaction stage of the operation.

The immersion serves to thoroughly coat all of the exposed metallic surfaces with the hydroxide solution and after coating, these surfaces are exposed to air to promote the reaction. This can be done in a variety of ways and preferably involves a suspension of the metallic charge in porous containers such as screen baskets.

In further accordance with this invention, a foaming or frothing agent is added to increase the contact between the hydroxide solution and the shreddings. Such foaming or frothing agent—which may comprise a salt water soap, a product sold under the trade name "Dupinol," which is a sodium lauryl sulfate composition, various other sulfonated alcohol compositions, and the like—is preferably introduced into the hydroxide solution in the lower portion of the tank beneath the shreddings. The solution, including the foaming agent, is preferably subjected to intense agitation, and also may be subjected to intense aeration, so that a large head of foam is formed at the surface by bubbles rising through the liquid and across the surfaces of the shreddings.

Air is fed into the tank 4, preferably under pressure, and distributed and dispersed throughout the solution by the action of a rotary impeller. The gas bubbles rise to the surface passing along the submerged metallic surfaces in their travel and thus such surfaces are kept in almost constant contact with air. This treatment continues for a sufficient length of time to reduce the tin and lead content of the steel sufficiently that the remaining tin and lead content therein is within prescribed limits.

At the end of the reaction interval, the steel scrap is removed from tank 4 as a final product. As previously indicated, this matter after drying usually is fed into a press and formed into compact bundles.

After removal of the steel scrap final product, the solution from tank 4 is passed into a second tank 5 entitled "Treatment tank #2" in the flow sheet to designate the second reaction stage. Lime as hydroxide is fed into tank 5 and induces precipitation of the lead and tin content as previously described. When the reaction in Treatment tank #2 has progressed sufficiently to precipitate the tin and lead salts and regenerate the hydroxide solution, such solution is drawn off from tank 5 by a pump 6 and is subsequently introduced into tank #4 for a repetition of the treatment hereinbefore described.

The tin and lead salts precipitated in the second treatment in tank 5 are delivered to a tin and lead recovery plant after their removal from the solution and are there processed by well known methods to recover the tin and lead content.

While the foregoing operation may be considered the preferred procedure based upon present experience, a number of variations may be resorted to within the spirit and scope of the invention.

While the invention has been designed primarily to treat tin cans usually considered a waste material, it also is suited for application to other tinned steel scrap material such as terneplate, particularly the shreddings thereof produced in various industrial operations where this material is used.

The shredding and washing operations have been found beneficial although not absolutely essential and might be eliminated from a given operation.

In tank 4 designated "Treatment tank #1," potassium hydroxide may be used as a substitute material in place of sodium hydroxide. Likewise, the reaction interval will vary considerably depending upon the effectiveness of the application of air to the coated surfaces. In some operations a reaction interval of forty minutes has been adequate, while in others as much as twenty-four hours will be required.

Where an adequate air introduction is employed, the solution in tank 4 requires no heating and will be effective at its normal temperature established by atmospheric conditions.

Several variations are possible in the reaction in treatment tank #2. In place of the lime introduction previously described, the hydroxides of barium or strontium may be employed with satisfactory results, although from both a cost and efficiency standpoint, the lime will be desirable in most instances.

Other variations may occur in the control of the reaction in tank 4. The reaction interval and efficiency has been found to be dependent upon the degree which the coated surfaces are brought in contact with air. One effective way of increasing air exposure is to suspend the shredded scrap in a loose condition in foraminous containers located in the upper portion of the tank but below its liquid level.

From the foregoing, it will be evident that the present invention provides an efficient and economical method for obtaining a substantial separation of the metals present in tinned steel scrap, and that the process may be substantially self-contained by producing the reagent, required at the first reaction stage, by chemical conversion in the second reaction stage. It will be understood that various changes may be made in the process, and that scrap or similar metal of various compositions and having varying amounts of tin may also be treated. It will also be understood that other changes are possible without departing from the spirit and scope of this invention.

What we claim and desire to secure by Letters Patent is:

1. The method of treating tinned steel scrap containing lead, which comprises immersing tinned steel scrap in a solution of sodium hydroxide to coat the metallic surfaces with the solution, continuously passing air and a foaming agent across the metallic surfaces so coated until a substantial quantity of the tin content of the steel has entered into solution; separating the resulting active solution from the steel scrap, removing the steel scrap from the treatment, then mixing the active solution with an alkaline-earth hydroxide, removing from the treatment the tin and lead salts precipitated by such intermixture, and supplying the metal-coating operation with the sodium hydroxide solution remaining after withdrawal of the precipitate.

2. In a method of treating tinned steel scrap, the steps which comprise immersing such scrap in a solution of an alkali metal hydroxide containing a foaming agent; and introducing oxygen containing gas into such solution to cause said scrap to be contacted by oxygen and the solution.

3. In a method of treating tinned steel scrap as defined in claim 2, wherein said foaming agent comprises a sulfonated alcohol composition.

4. In a method of treating tinned steel scrap as defined in claim 2, wherein said foaming agent comprises sodium lauryl sulphate.

5. In a method of treating tinned steel scrap as defined in claim 2, wherein said foaming agent comprises salt water soap.

6. In a method of treating tinned steel scrap containing lead, the steps which comprise immersing such scrap in a solution of alkali metal hydroxide containing a foaming agent; introducing oxygen-containing gas into such solution to cause said scrap to be contacted by oxygen and the solution, and thereby cause tin and lead of the scrap to enter into solution; introducing an alkaline-earth hydroxide into the resulting solution to precipitate tin and lead as alkaline-earth salts; and removing such precipitate.

7. In a method of treating tinned steel scrap containing lead, as defined in claim 6, in which alkali metal hydroxide is regenerated upon such precipitation of tin and lead salts, and in which such regenerated alkali metal hydroxide is utilized in the treatment of additional scrap.

ROBERT L. ALLDREDGE.
WILLIAM G. NORLANDER.